UNITED STATES PATENT OFFICE.

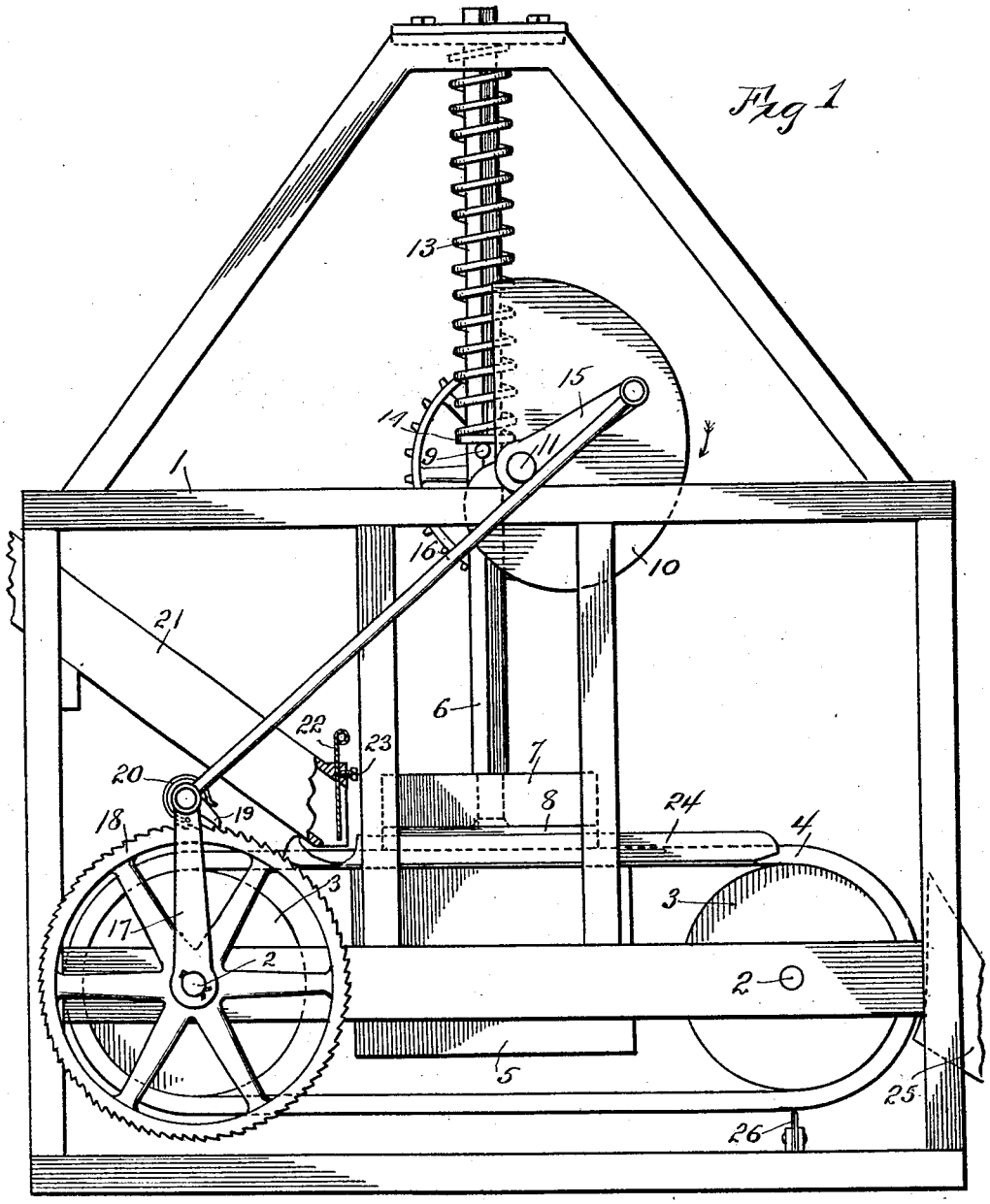

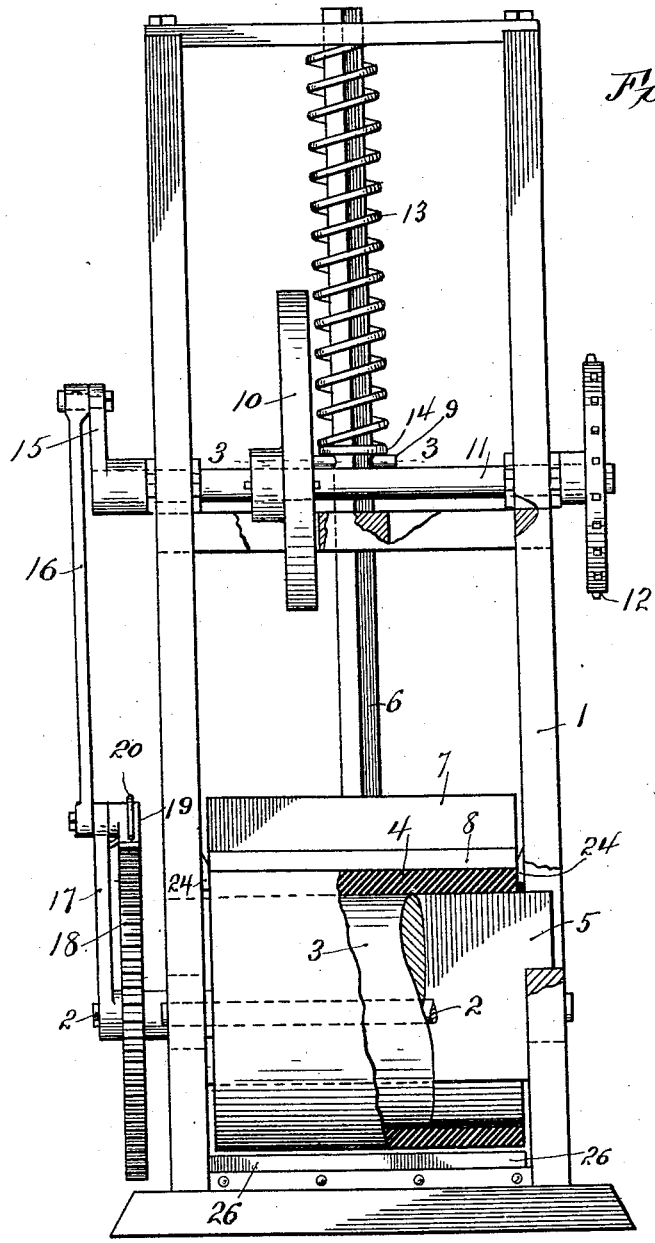

CHARLES D. TRAIN, OF BELKNAP, ILLINOIS.

METHOD OF CLEANING GRAIN.

1,118,078.      Specification of Letters Patent.      Patented Nov. 24, 1914.

Application filed February 6, 1914. Serial No. 816,970.

*To all whom it may concern:*

Be it known that I, CHARLES D. TRAIN, a citizen of the United States, residing at Belknap, in the county of Johnson and State of Illinois, have invented a certain new and useful Improvement in Methods of Cleaning Grain, of which the following is a specification.

My invention relates to improvements in methods of cleaning grain.

In many places, grain, such as wheat, is mixed with vegetable growths, such as wild onions and wild garlic. The onions and the garlic, such as are near the size of the wheat grains, are extremely difficult to separate from the wheat, and, so far as I am aware, prior to my invention, no successful commercial method has been devised for effecting the separation of the wheat from the onions and garlic. Wheat, which is mixed with any considerable amount of wild onions and garlic, is unfit for being made into flour, and for this reason it is of small value except for stock food.

The object of my invention is to provide a method which will effectually and cheaply eliminate wild onions or garlic or other bodies softer than the grain from the grain. This object I accomplish by altering the physical structure of the wild onions or garlic, so that they may be separated from the grain by the usual operation of sifting or fanning.

In the preferred form of my invention, I subject the mixed grain and softer vegetable bodies to percussion sufficient to flatten the softer bodies without crushing or flattening the grain. After the softer bodies have been thus flattened, they may readily be separated from the grain by sifting or fanning.

In the accompanying drawings which illustrate an apparatus for carrying into effect my invention, Figure 1 is a side elevation of the machine partly broken away. Fig. 2 is an end view of the machine partly broken away. Fig. 3 is a horizontal section on the line 3—3 of Fig. 2.

Similar reference characters designate similar parts in the different views.

1 designates the frame of the machine, 2 two horizontal parallel shafts rotatably mounted in the framework 1 and having secured respectively thereto drums 3 on which is mounted a belt 4, which is adapted to travel over and rest upon an anvil 5, which is supported by the frame 1. Slidably mounted in the frame 1 is a plunger rod 6 having secured to its lower end a plunger 7 having, preferably, secured to its under side a flat yielding plate 8 composed, preferably, of a material such as soft rubber which is adapted to strike against the upper side of that portion of the belt which is resting upon the anvil 5. The belt 4 is also, preferably, composed of yielding material, such as soft rubber, and, like the plate 8, the belt 4 has rigidity sufficient to crush the softer bodies, such as the onions and garlic, but it is sufficiently yielding to not crush the grain. I have found that rubber made by the Goodyear Rubber Company and styled number 1131, is possessed of the desired rigidity and resiliency for effecting the purpose.

The plunger rod 6 has extending through it a pin 9, which is adapted to ride on the periphery of a cam 10 which is secured to and rotatable with the horizontal shaft 11, which is rotatably mounted in the frame 1 and has secured to it a driving sprocket wheel 12, which is adapted to be driven by a chain belt not shown.

The cam 10 is of convolute form, and when rotated in the direction indicated by the arrow in Fig. 1, lifts the plunger off from the belt 4 and then permits the plunger to be moved suddenly downwardly, once during each revolution of the cam, by means of a coil spring 13 which encircles the rod 6, and which bears at its lower end upon a washer 14 which rests upon the pin 9. The upper end of the spring 13 bears against the frame 1.

Secured to the shaft 11 is a crank 15 to which is pivoted one end of a connecting rod 16, the other end of which is pivoted to a crank 17, which is pivoted to the adjacent shaft 2. Rigidly secured to said shaft is a ratchet wheel 18 which is engaged by a pawl 19 pivoted on the crank 17, and normally held engaged with the ratchet wheel by a spring 20, which is secured to the crank 17.

After the pin 9 has passed off from the cam 10, as shown in Fig. 1, the crank 17 and pawl 19 will be retracted, the pawl slipping over the teeth of the ratchet wheel 18, until the crank 15 has reached a position nearly diametrically opposite that shown in Fig. 1, at which time the crank 15 will move the rod 16, crank 17 and pawl 19 in the opposite direction, upon which the pawl will engage the ratchet wheel, thereby turning the shaft 2 and the adjacent drum 3, thereby driving the belt 4 in a clockwise direction.

The arrangement of the parts is such that when the belt 4 is driven the cam 10 will be supporting the plunger out of contact with the belt 4.

The material to be prepared is fed downwardly on the belt 4 through an inclined chute 21, the lower end of which is disposed adjacent to the head 7 of the plunger. The open lower end of the chute 21 is partly closed by means of a vertically slidable valve 22 which may be vertically adjustable, and which is secured in the position to which it may be adjusted by means of a set screw 23. The valve 22 is adjusted to a position in which the mixed grain and softer bodies are discharged in a thin sheet upon the upper side of the belt 4.

For retaining the mixture on the belt during its passage under the plunger, two guide plates 24 are secured to the frame 1 at opposite edges of and overlapping the rubber plate 8 and the adjacent opposite edges of the belt 4, as shown in Fig. 2.

In the operation of the apparatus illustrated in the drawings, the shaft 11 is rotated, thereby rotating the cam 10, thus lifting the plunger 7 and causing the belt to be driven, preferably, the distance equal to the width of the plunger during each revolution of the shaft 11. When the belt 4 is driven, the mixed grain and onions and garlic will be fed thereon from the chute 21 in a thin sheet, which will pass under the plunger 7 and over the anvil 5. Before the pin 9 runs off from the cam 10, the advancing movement of the ratchet wheel 18 will have ceased. When the cam 10 has reached a position in which the pin 9 will be released therefrom, the spring 13 will force the plunger violently downwardly until the yielding plate 8 has flatly compressed the softer bodies, such as the onions and the garlic, the harder bodies, such as the grain, being embedded in the yielding plate 8 and the yielding belt 4. After the plunger has been forced downwardly, the cam 10 will again lift it against the pressure of the spring 13, and the belt 4 will be again advanced, thereby feeding new material from the chute 21 upon the belt and carrying it into a position over the anvil 5 where it may be operated upon by the plunger. The material, which has already been operated upon, will be carried by the belt 4 to the right, as viewed in Fig. 1, and will be discharged into a chute 25 located adjacent to one end of the frame 1. The material which has been treated may be now carried to an ordinary fanning mill or sifting mechanism, not shown, and subjected to fanning or sifting or both, by means of which the flattened bodies may be readily separated from the grain.

The onions and garlic contain a large amount of oil, which, after the crushing operation, is deposited on the belt 4, from which it may be removed by means of a transverse scraper 26, which is located lower than and to the left of the chute 25, as viewed in Fig. 1.

The percussion operation, which is effected by the violent propulsion of the plunger against the material which is being treated, effects more than simply a flattening of the onions and garlic. The percussion effect upon these bodies is similar to that obtained by blowing up a paper bag, and, while holding it closed, submitting it to violent percussion between the hands. The sudden compression of the softer bodies between the belt and plunger effects an explosion of each body due to the compression of what air may be contained therein, thereby shattering the body, as well as flattening it, thus making it fluffy and of irregular shape, so that it is readily separated from the grain by fanning or sifting. The deforming of the onions and garlic by flattening makes them larger in diameter, thus facilitating the separation by sifting, and the flattening operation squeezes out the oil and moisture, thus making them lighter, whereby the separation by fanning is facilitated.

Modifications of my invention, within the scope of the appended claims, may be made without departing from the spirit of my invention.

Having thus described my invention, what I claim and desire to secure by Letters Patent, is:—

1. The method of preparing grain mixed with softer bodies for cleaning, consisting in subjecting opposite sides of the elements of the mixture to percussion sufficient to crush the softer bodies but insufficient to crush the grain.

2. The method of preparing grain mixed with softer bodies for cleaning, consisting in subjecting the mixture to percussion between two surfaces, one of which is yielding, but which has rigidity sufficient to crush the softer bodies without crushing the grain.

3. The method of preparing grain mixed with softer bodies for cleaning, consisting in subjecting the mixture to percussion between two yielding surfaces having rigidity sufficient to crush the softer bodies without crushing the grain.

4. The method of preparing grain mixed with softer bodies for cleaning, consisting in spreading the mixture into a thin sheet and then simultaneously subjecting opposite sides of the sheet to percussion sufficient to crush the softer bodies.

5. The method of preparing grain mixed with softer bodies for cleaning, consisting in spreading the mixture into a thin sheet and then simultaneously subjecting opposite sides of the sheet to percussion sufficient to crush the softer bodies without crushing the grain.

6. The method of preparing grain mixed with softer bodies for cleaning, consisting in simultaneously subjecting opposite sides of the mixture to percussion sufficient to crush the softer bodies.

7. The method of preparing grain mixed with softer bodies for cleaning, consisting in spreading the mixture into a thin sheet and then subjecting the sheet to percussion between two yielding surfaces having rigidity sufficient to crush the softer bodies without crushing the grain.

8. The method of preparing grain mixed with softer bodies for cleaning, consisting in spreading the mixture into a thin sheet and then subjecting the sheet to percussion between two surfaces, one of which is yielding, but which has rigidity sufficient to crush the softer bodies without crushing the grain.

9. The method consisting in subjecting opposite sides of a mixture of grain with wild onions, wild garlic or similar vegetable growths to percussion thereby crushing the vegetable growths without crushing the grain.

In testimony whereof I have signed my name to this specification in presence of two subscribing witnesses.

CHARLES D. TRAIN.

Witnesses:
D. WM. THOMSON,
D. G. MARTIN.

Copies of this patent may be obtained for five cents each, by addressing the "Commissioner of Patents, Washington, D. C."